United States Patent
Su et al.

(10) Patent No.: US 12,197,737 B2
(45) Date of Patent: Jan. 14, 2025

(54) DECODING METHOD, MEMORY STORAGE DEVICE AND MEMORY CONTROL CIRCUIT UNIT

(71) Applicant: PHISON ELECTRONICS CORP., Miaoli (TW)

(72) Inventors: Po-Cheng Su, Hsinchu (TW); Yu-Cheng Hsu, Yilan County (TW); Wei Lin, Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 73 days.

(21) Appl. No.: 18/168,573

(22) Filed: Feb. 14, 2023

(65) Prior Publication Data

US 2024/0201857 A1    Jun. 20, 2024

(30) Foreign Application Priority Data

Dec. 16, 2022    (TW) .................................. 111148596

(51) Int. Cl.
*G06F 3/06* (2006.01)

(52) U.S. Cl.
CPC .......... *G06F 3/0613* (2013.01); *G06F 3/0659* (2013.01); *G06F 3/0679* (2013.01)

(58) Field of Classification Search
CPC ..... G06F 3/0613; G06F 3/0659; G06F 3/0679
See application file for complete search history.

(56) References Cited

U.S. PATENT DOCUMENTS

| | | | |
|---|---|---|---|
| 2018/0188958 A1* | 7/2018 | Kim | G06F 3/0655 |
| 2019/0163567 A1* | 5/2019 | Lin | H03M 13/3715 |
| 2020/0012560 A1 | 1/2020 | Cheng et al. | |
| 2021/0306010 A1* | 9/2021 | Lin | H03M 13/23 |
| 2022/0044712 A1* | 2/2022 | Okabe | G11C 7/106 |
| 2023/0317201 A1* | 10/2023 | Choi | G11C 29/52 |
| | | | 365/185.09 |
| 2024/0152296 A1* | 5/2024 | Liu | G11C 16/26 |
| 2024/0201857 A1* | 6/2024 | Su | G06F 3/0613 |
| 2024/0204072 A1* | 6/2024 | Tsai | H01L 29/42392 |

FOREIGN PATENT DOCUMENTS

CN     105023609    11/2015

* cited by examiner

*Primary Examiner* — Sean D Rossiter
(74) *Attorney, Agent, or Firm* — JCIPRNET

(57) ABSTRACT

A decoding method, a memory storage device, and a memory control circuit unit are disclosed. The method includes: sending at least one read command sequence instructing to read a first physical unit in a rewritable non-volatile memory module; receiving response data from the rewritable non-volatile memory module, wherein the response data includes a plurality of identification bits, and the plurality of identification bits reflect a voltage variation of a first bit line where a first memory cell in the first physical unit is located during a discharge process; determining a decoding parameter corresponding to the first memory cell according to the plurality of identification bits; and decoding data read from the first memory cell according to the decoding parameter.

21 Claims, 9 Drawing Sheets

DECODING METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 111148596, filed on Dec. 16, 2022. The entirety of the above-mentioned patent application is hereby incorporated by reference herein and made a part of this specification.

BACKGROUND OF THE INVENTION

Field of the Invention

The invention relates to a memory control technique, and more particularly, to a decoding method, a memory storage device, and a memory control circuit unit.

Description of Related Art

Mobile phones, tablets, and notebook computers have grown rapidly in recent years, resulting in a rapid increase in consumer demand for storage media. Since a rewritable non-volatile memory module (such as a flash memory) has characteristics such as data non-volatility, power-saving, small size, and lack of mechanical structures, the rewritable non-volatile memory module is very suitable to be built into the various portable multimedia devices provided above.

In order to ensure the correctness of data, the data stored in the rewritable non-volatile memory module may be encoded. When reading data from the rewritable non-volatile memory module, the read data may be decoded to correct errors. However, how to improve the decoding efficiency of the data read from the rewritable non-volatile memory module is an important research topic for those skilled in the art.

SUMMARY OF THE INVENTION

The invention provides a decoding method, a memory storage device, and a memory control circuit unit that may improve the decoding efficiency of data read from rewritable non-volatile memory module.

An exemplary embodiment of the invention provides a decoding method, configured for a rewritable non-volatile memory module, the decoding method including: sending at least one read command sequence, wherein the at least one read command sequence instructs to read a first physical unit in the rewritable non-volatile memory module; receiving response data from the rewritable non-volatile memory module, wherein the response data includes a plurality of identification bits, and the plurality of identification bits reflect a voltage variation of a first bit line where a first memory cell in the first physical unit is located during a discharge process; determining a decoding parameter corresponding to the first memory cell according to the plurality of identification bits; and decoding data read from the first memory cell according to the decoding parameter.

In an exemplary embodiment of the invention, the plurality of identification bits reflect a plurality of sensing results of a voltage state of the first bit line at different time points during the discharge process of the first bit line.

In an exemplary embodiment of the invention, the discharge process includes a discharge process of the first bit line after a pre-charge.

In an exemplary embodiment of the invention, the at least one read command sequence has at least one time parameter, and the at least one time parameter is configured to control a sensing time point of at least one of the plurality of identification bits.

In an exemplary embodiment of the invention, the plurality of identification bits include a first identification bit, the at least one time parameter includes a first time parameter, and the first time parameter corresponds to a time difference between a sensing time point of the first identification bit and a discharge start time point of the first bit line.

In an exemplary embodiment of the invention, a total number of the at least one time parameter is positively correlated with a total number of the plurality of identification bits.

In an exemplary embodiment of the invention, the step of determining the decoding parameter corresponding to the first memory cell according to the plurality of identification bits includes: setting the decoding parameter corresponding to the first memory cell to a first value in response to the plurality of identification bits meeting a first condition; and setting the decoding parameter corresponding to the first memory cell to a second value in response to the plurality of identification bits meeting a second condition, and the first value is different from the second value.

An exemplary embodiment of the invention further provides a memory storage device including a connection interface unit, a rewritable non-volatile memory module, and a memory control circuit unit. The connection interface unit is configured to be coupled to a host system. The memory control circuit unit is coupled to the connection interface unit and the rewritable non-volatile memory module. The memory control circuit unit is configured to: send at least one read command sequence, wherein the at least one read command sequence instructs to read a first physical unit in the rewritable non-volatile memory module; receive response data from the rewritable non-volatile memory module, wherein the response data includes a plurality of identification bits, and the plurality of identification bits reflect a voltage variation of a first bit line where a first memory cell in the first physical unit is located during a discharge process; determine a decoding parameter corresponding to the first memory cell according to the plurality of identification bits; and decode data read from the first memory cell according to the decoding parameter.

In an exemplary embodiment of the invention, the operation of the memory control circuit unit determining the decoding parameter corresponding to the first memory cell according to the plurality of identification bits includes: setting the decoding parameter corresponding to the first memory cell to a first value in response to the plurality of identification bits meeting a first condition; and setting the decoding parameter corresponding to the first memory cell to a second value in response to the plurality of identification bits meeting a second condition, and the first value is different from the second value.

An exemplary embodiment of the invention further provides a memory control circuit unit configured to control a rewritable non-volatile memory module. The memory control circuit unit includes a host interface, a memory interface, an error detecting and correcting circuit, and a memory management circuit. The host interface is configured to be coupled to a host system. The memory interface is configured to be coupled to the rewritable non-volatile memory module. The memory management circuit is coupled to the host interface, the memory interface, and the error detecting and correcting circuit. The memory management circuit is configured to: send at least one read command sequence, wherein the at least one read command sequence instructs to read a first physical unit in the rewritable non-volatile memory module; receive response data from the rewritable non-volatile memory module, wherein the response data includes a plurality of identification bits, and the plurality of identification bits reflect a voltage variation of a first bit line where a first memory cell in the first physical unit is located during a discharge process; and determine a decoding parameter corresponding to the first memory cell according to the plurality of identification bits, and the error detecting and correcting circuit is configured to decode data read from the first memory cell according to the decoding parameter.

In an exemplary embodiment of the invention, the operation of the memory management circuit determining the decoding parameter corresponding to the first memory cell according to the plurality of identification bits includes: setting the decoding parameter corresponding to the first memory cell to a first value in response to the plurality of identification bits meeting a first condition; and setting the decoding parameter corresponding to the first memory cell to a second value in response to the plurality of identification bits meeting a second condition, and the first value is different from the second value.

Based on the above, after the at least one read command sequence is sent to instruct to read the first physical unit in the rewritable non-volatile memory module, the response data from the rewritable non-volatile memory module may be received. In particular, the response data may include the plurality of identification bits, and the plurality of identification bits reflect the voltage variation of the first bit line where the first memory cell in the first physical unit is located during the discharge process. According to the plurality of identification bits, the decoding parameter corresponding to the first memory cell may be determined. Then, the data read from the first memory cell may be decoded according to the decoding parameter. Thereby, the decoding efficiency of the data read from the rewritable non-volatile memory module may be effectively improved.

DESCRIPTION OF THE EMBODIMENTS

In general, a memory storage device (also referred to as a memory storage system) includes a rewritable non-volatile memory module and a controller (also referred to as a control circuit). The memory storage device may be used with a host system, such that the host system may write data into the memory storage device or read data from the memory storage device.

Figure 1:
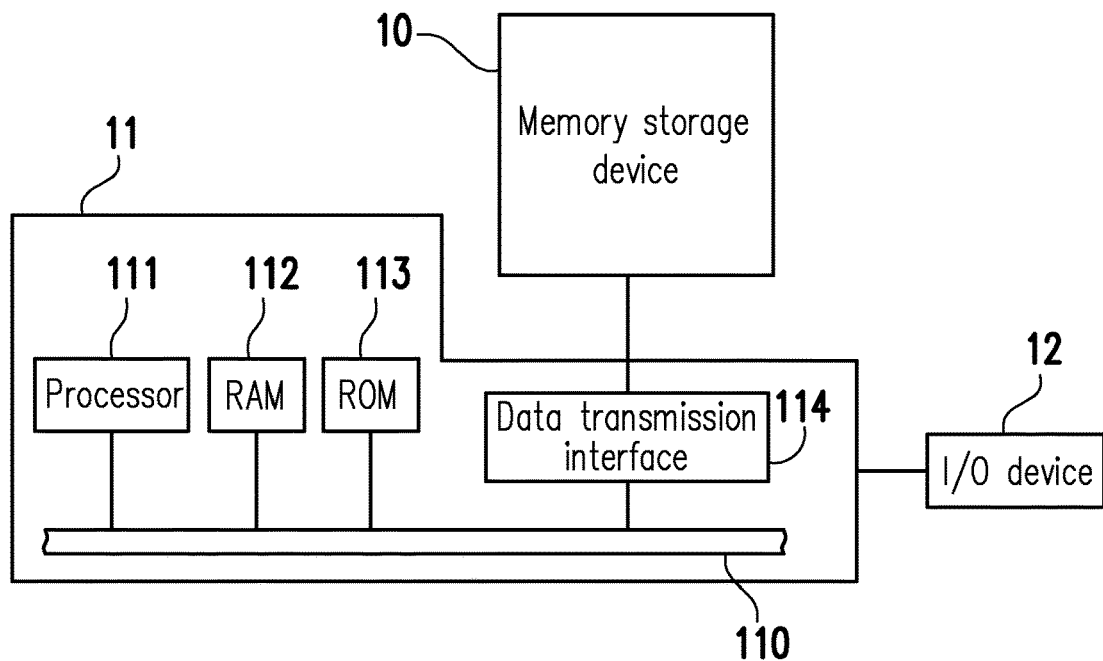
FIG. 1 is a schematic diagram of a host system, a memory storage device, and an input/output (I/O) device shown according to an exemplary embodiment of the invention.
Figure 2:
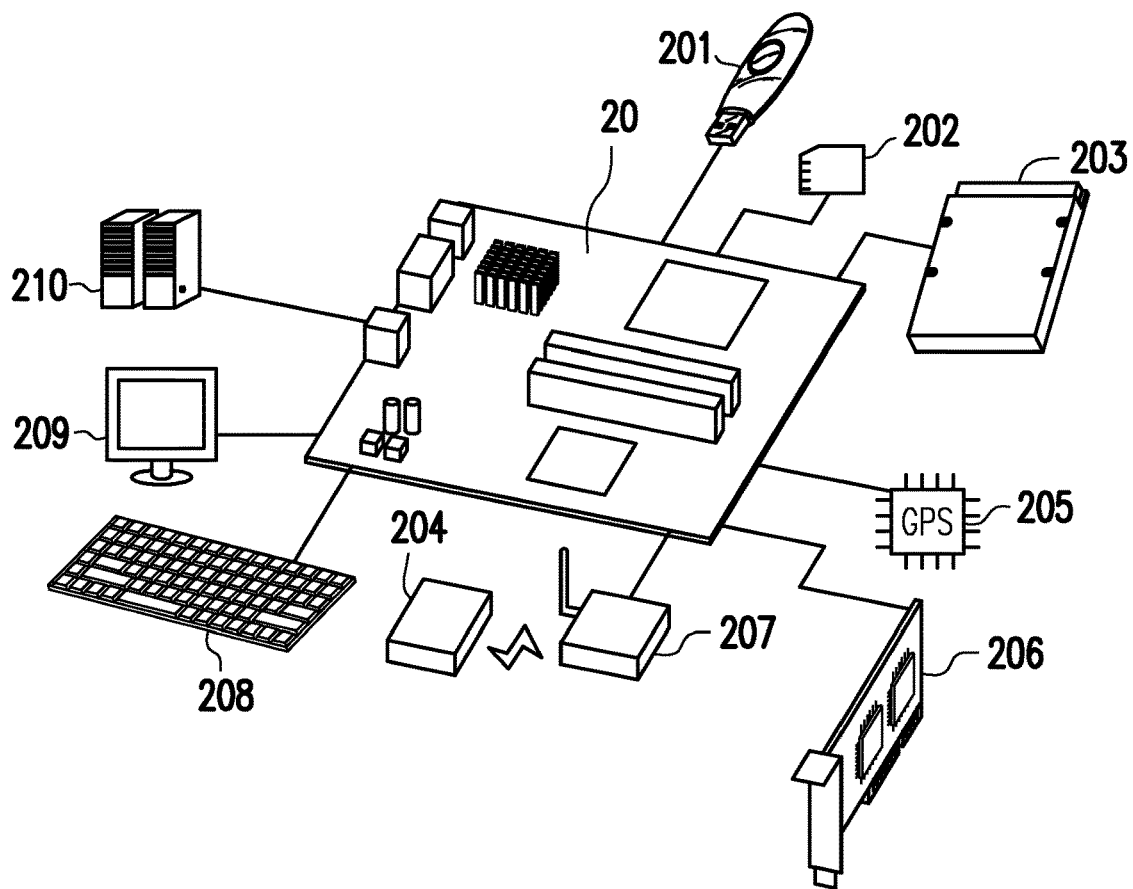
FIG. 2 is a schematic diagram of a host system, a memory storage device, and an I/O device shown according to an exemplary embodiment of the invention.

FIG. 1 is a schematic diagram of a host system, a memory storage device, and an input/output (I/O) device shown according to an exemplary embodiment of the invention. FIG. 2 is a schematic diagram of a host system, a memory storage device, and an I/O device shown according to an exemplary embodiment of the invention.

Referring to FIG. 1 and FIG. 2, a host system 11 may include a processor 111, a random-access memory (RAM) 112, a read-only memory (ROM) 113, and a data transmission interface 114. The processor 111, the RAM 112, the ROM 113, and the data transmission interface 114 may be coupled to a system bus 110.

In an exemplary embodiment, the host system 11 may be coupled to the memory storage device 10 via the data transmission interface 114. For example, the host system 11 may store data into the memory storage device 10 or read data from the memory storage device 10 via the data transmission interface 114. Moreover, the host system 11 may be coupled to the I/O device 12 via the system bus 110. For example, the host system 11 may send an output signal to the I/O device 12 or receive an input signal from the I/O device 12 via the system bus 110.

In an exemplary embodiment, the processor 111, the RAM 112, the ROM 113, and the data transmission interface 114 may be disposed on a motherboard 20 of the host system 11. The quantity of the data transmission interface 114 may be one or more. The motherboard 20 may be coupled to the memory storage device 10 in a wired or wireless way via the data transmission interface 114.

In an exemplary embodiment, the memory storage device 10 may be, for example, a flash drive 201, a memory card 202, a solid-state drive (SSD) 203, or a wireless memory storage device 204. The wireless memory storage device 204 may be, for example, a memory storage device based on various wireless communication techniques such as a near-field communication (NFC) memory storage device, a wireless fax (WiFi) memory storage device, a Bluetooth memory storage device, or a low-power Bluetooth memory storage device (such as iBeacon). Moreover, the motherboard 20 may also be coupled to various I/O devices such as a global positioning system (GPS) module 205, a network interface card 206, a wireless transmission device 207, a keyboard 208, a screen 209, or a speaker 210 via the system bus 110. For example, in an exemplary embodiment, the motherboard 20 may access the wireless memory storage device 204 via the wireless transmission device 207.

In an exemplary embodiment, the host system 11 is a computer system. In an exemplary embodiment, the host system 11 may be any system that may substantially store data with the memory storage device. In an exemplary embodiment, the memory storage device 10 and the host system 11 may respectively include a memory storage device 30 and a host system 31 of FIG. 3.

Figure 3:
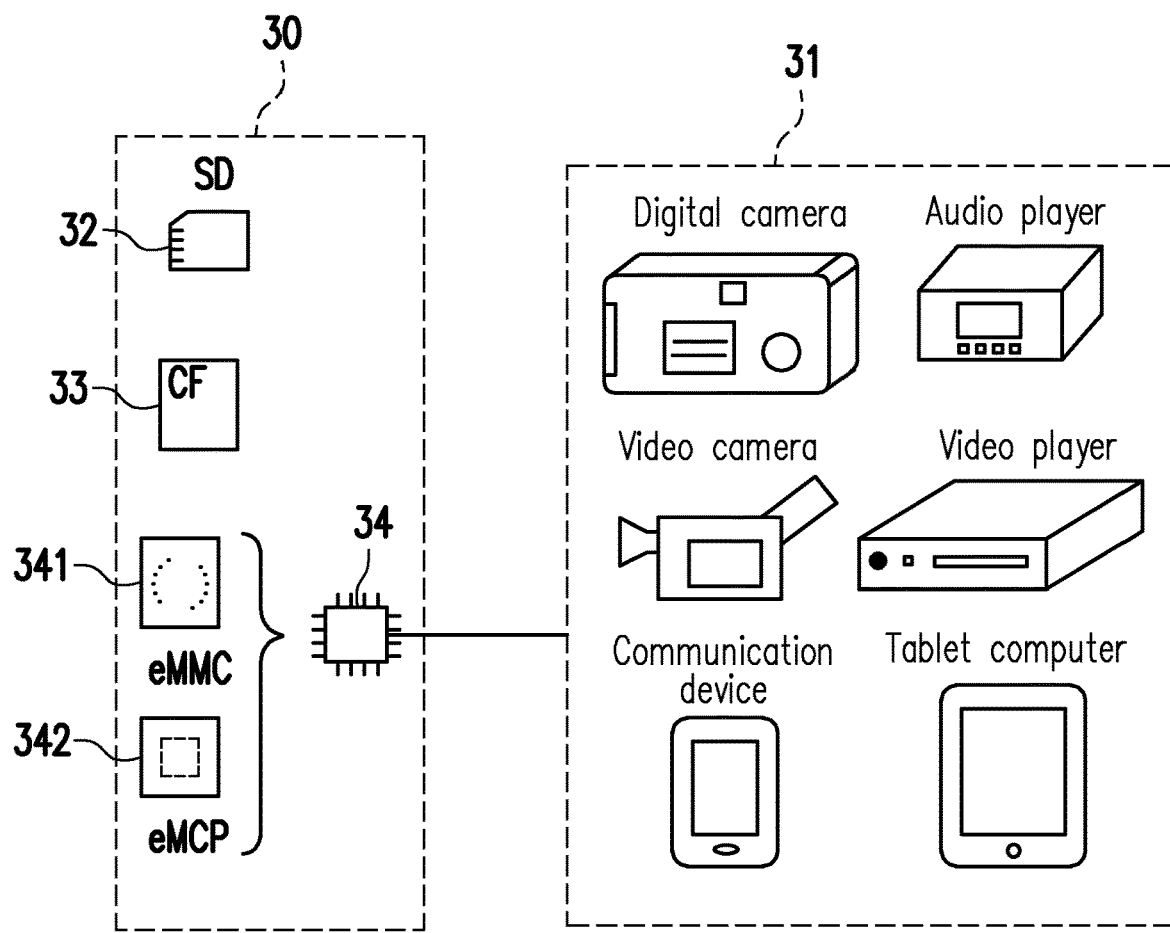
FIG. 3 is a schematic of a host system and a memory storage device shown according to an exemplary embodiment of the invention.

FIG. 3 is a schematic of a host system and a memory storage device shown according to an exemplary embodiment of the disclosure.

Referring to FIG. 3, the memory storage device 30 may be used in conjunction with the host system 31 to store data. For example, the host system 31 may be a system such as a digital camera, a video camera, a communication device, an audio player, a video player, or a tablet computer. For example, the memory storage device 30 may be various non-volatile memory storage devices such as a Secure Digital (SD) card 32, a Compact Flash (CF) card 33, or an embedded storage device 34 used by the host system 31. The embedded storage device 34 includes various types of embedded storage devices for which a memory module is directly coupled on the substrate of the host system, such as an embedded multimedia card (eMMC) 341 and/or an embedded multi-chip package (eMCP) storage device 342.

Figure 4:
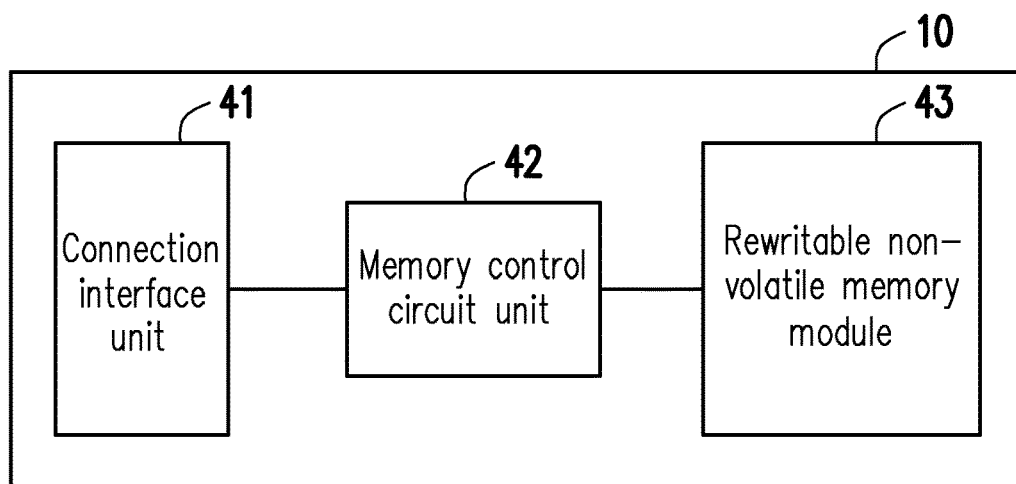
FIG. 4 is a schematic diagram of a memory storage device shown according to an exemplary embodiment of the invention.

FIG. 4 is a schematic diagram of a memory storage device shown according to an exemplary embodiment of the invention.

Referring to FIG. 4, the memory storage device 10 includes a connection interface unit 41, a memory control circuit unit 42, and a rewritable non-volatile memory module 43.

The connection interface unit 41 is configured to couple the memory storage device 10 to the host system 11. The memory storage device 10 may be communicated with the host system 11 via the connection interface unit 41. In an exemplary embodiment, the connection interface unit 41 is compatible with the Peripheral Component Interconnect Express (PCI Express) standard. In an exemplary embodiment, the connection interface unit 41 may also conform to the Serial Advanced Technology Attachment (SATA) standard, Parallel Advanced Technology Attachment (PATA) standard, Institute of Electrical and Electronic Engineers (IEEE) 1394 standard, Universal Serial Bus (USB) standard, SD interface standard, Ultra High Speed-I (UHS-I) interface standard, Ultra High Speed-II (UHS-II) interface standard, Memory Stick (MS) interface standard, MCP interface standard, MMC interface standard, eMMC interface standard, Universal Flash Storage (UFS) interface standard, eMCP interface standard, CF interface standard, Integrated Device Electronics (IDE) standard, or other suitable standards. The connection interface unit 41 may be sealed in a chip with the memory control circuit unit 42. Alternatively, the connection interface unit 41 is disposed outside of a chip containing the memory control circuit unit 42.

The memory control circuit unit 42 is coupled to the connection interface unit 41 and the rewritable non-volatile memory module 43. The memory control circuit unit 42 is configured to perform a plurality of logic gates or control commands implemented in a hardware form or in a firmware form. The memory control circuit unit 404 also performs operations such as writing, reading, and erasing data in the rewritable non-volatile memory storage module 43 according to the commands of the host system 11.

The rewritable non-volatile memory module 43 is configured to store the data written by the host system 11. The rewritable non-volatile memory module 43 may include a single-level cell (SLC) NAND-type flash memory module (that is, a flash memory module that may store 1 bit in one memory cell), a multi-level cell (MLC) NAND-type flash memory module (that is, a flash memory module that may store 2 bits in one memory cell), a triple-level cell (TLC) NAND-type flash memory module (i.e., a flash memory module that may store 3 bits in one memory cell), a quad-level cell (QLC) NAND-type flash memory module (that is, a flash memory module that may store 4 bits in one memory cell), other flash memory modules, or other memory modules with the same characteristics.

Each of the memory cells in the rewritable non-volatile memory module 43 stores one or a plurality of bits via the change in voltage (also referred to as threshold voltage hereinafter). Specifically, a charge-trapping layer is disposed between the control gate and the channel of each of the memory cells. By applying a write voltage to the control gate, the number of electrons of the charge-trapping layer may be changed, and therefore the threshold voltage of the memory cells may be changed. This operation of changing the threshold voltage of the memory cells is also referred to as "writing data to the memory cells" or "programming the memory cells". As the threshold voltage is changed, each of the memory cells in the rewritable non-volatile memory module 43 has a plurality of storage states. Which storage state one memory cell belongs to may be determined via the application of a read voltage, so as to obtain one or a plurality of bits stored by the memory cell.

In an exemplary embodiment, the memory cells of the rewritable non-volatile memory module 43 may form a plurality of physical programming units, and these physical programming units may form a plurality of physical erasing units. Specifically, the memory cells on the same word line may form one or a plurality of physical programming units. If one memory cell may store two or more bits, the physical programming units on the same word line may at least be classified into lower physical programming units and upper physical programming units. For example, the least significant bit (LSB) of a memory cell belongs to the lower physical programming units, and the most significant bit (MSB) of a memory cell belongs to the upper physical programming units. Generally, in an MLC NAND-type flash memory, the write speed of the lower physical programming units is greater than the write speed of the upper physical programming units, and/or the reliability of the lower physical programming units is greater than the reliability of the upper physical programming units.

In an exemplary embodiment, the physical programming unit is the smallest unit of programming. That is, the physical programming unit is the smallest unit of data writing. For example, the physical programming unit may be a physical page or a physical sector. If the physical programming unit is a physical page, then the physical programming unit may include a data bit area and a redundancy bit area. The data bit area contains a plurality of physical sectors configured to store user data, and the redundancy bit area is configured to store system data (for example, management data such as an error correcting code). In an exemplary embodiment, the data bit area contains 32 physical sectors, and the size of one physical sector is 512 bytes (B). However, in other exemplary embodiments, the data bit area may also contain 8, 16, or a greater or lesser number of physical sectors, and the size of each of the physical sectors may also be greater or smaller. Moreover, the physical erasing unit is the smallest unit of erasing. That is, each of the physical erasing units contains the smallest number of memory cells erased together. For example, the physical erasing unit is a physical block.

Figure 5:
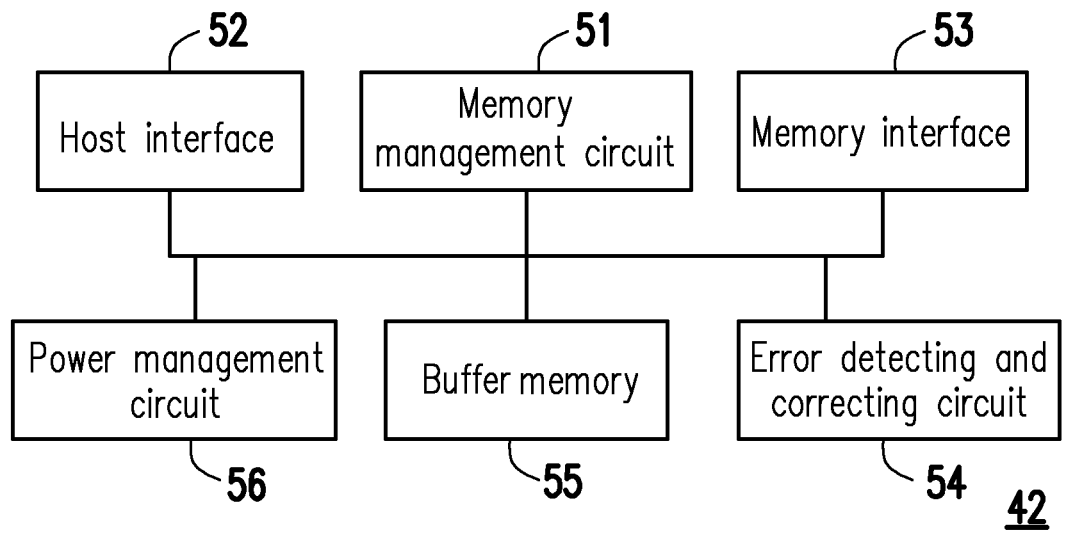
FIG. 5 is a schematic diagram of a memory control circuit unit shown according to an exemplary embodiment of the invention.

FIG. 5 is a schematic diagram of a memory control circuit unit shown according to an exemplary embodiment of the invention.

Referring to FIG. 5, the memory control circuit unit 42 includes a memory management circuit 51, a host interface 52, and a memory interface 53. The memory management circuit 51 is configured to control the overall operation of the memory control circuit unit 42. Specifically, the memory management circuit 51 has a plurality of control commands. During the operation of the memory storage device 10, the control commands are executed to perform operations such as writing, reading, and erasing data. In the following, descriptions relating to the operation of the memory management circuit 51 are equivalent to the descriptions of the operation of the memory control circuit unit 42.

In an exemplary embodiment, the control commands of the memory management circuit 51 are implemented in a firmware form. For example, the memory management circuit 51 has a microprocessor unit (not shown) and a read-only memory (not shown), and the control commands are burned into the ROM. During the operation of the memory storage device 10, the control commands are executed by the microprocessor unit to perform operations such as writing, reading, and erasing data.

In an exemplary embodiment, the control commands of the memory management circuit 51 may also be stored in the form of program codes in a specific area (for example, the system area in a memory module exclusively configured to store system data) of the rewritable non-volatile memory module 43. Moreover, the memory management circuit 51 has a microprocessor unit (not shown), a ROM (not shown), and a RAM (not shown). In particular, the ROM has a boot code, and when the memory control circuit unit 42 is enabled, the microprocessor unit first executes the boot code to load the control commands stored in the rewritable non-volatile memory module 43 into the RAM of the memory management circuit 51. Next, the microprocessor unit runs the control commands to perform operations such as writing, reading, and erasing data.

In an exemplary embodiment, the control commands of the memory management circuit 51 may also be implemented in a hardware form. For example, the memory management circuit 51 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is configured to manage the memory cells or memory cell groups of the rewritable non-volatile memory module 43. The memory write circuit is configured to issue a write command sequence to the rewritable non-volatile memory module 43 to write data into the rewritable non-volatile memory module 43. The memory read circuit is configured to issue a read command sequence to the rewritable non-volatile memory module 43 to read data from the rewritable non-volatile memory module 43. The memory erase circuit is configured to issue an erase command sequence to the rewritable non-volatile memory module 43 to erase data from the rewritable non-volatile memory module 43. The data processing circuit is configured to process data to be written into the rewritable non-volatile memory module 43 and data read from the rewritable non-volatile memory module 43. The write command sequence, the read command sequence, and the erase command sequence may independently include one or a plurality of program codes or command codes and be configured to instruct the rewritable non-volatile memory module 43 to perform corresponding operations such as writing, reading, and erasing. In an exemplary embodiment, the memory management circuit 51 may also issue other types of command sequences to the rewritable non-volatile memory module 43 to instruct the performance of corresponding operations.

The host interface 52 is coupled to the memory management circuit 51. The memory management circuit 51 may be communicated with the host system 11 via the host interface 52. The host interface 52 may be configured to receive and identify commands and data sent by the host system 11. For example, the commands and data sent by the host system 11 may be sent to the memory management circuit 51 via the host interface 52. In addition, the memory management circuit 51 may send data to the host system 11 via the host interface 52. In the present exemplary embodiment, the host interface 52 is compatible with the PCI Express standard. However, it should be understood that the invention is not limited thereto, and the host interface 52 may also be compatible with the SATA standard, PATA standard, IEEE 1394 standard, USB standard, SD standard, UHS-I standard, UHS-II standard, MS standard, MMC standard, eMMC standard, UFS standard, CF standard, IDE standard, or other suitable standards for data transmission.

The memory interface 53 is coupled to the memory management circuit 51 and is configured to access the rewritable non-volatile memory module 43. For example, the memory management circuit 51 may access the rewritable non-volatile memory module 43 via the memory interface 53. In other words, data to be written into the rewritable non-volatile memory module 43 is converted to a format acceptable to the rewritable non-volatile memory module 43 via the memory interface 53. Specifically, if the memory management circuit 51 is to access the rewritable non-volatile memory module 43, the memory interface 53 sends a corresponding command sequence. For example, the command sequences may include a write command sequence instructing data writing, a read command sequence instructing data reading, an erase command sequence instructing data erasing, and corresponding command sequences configured to instruct various memory operations (such as changing read voltage level or performing a garbage collection operation). The command sequences are generated by, for example, the memory management circuit 51 and sent to the rewritable non-volatile memory module 43 via the memory interface 53. The command sequences may include one or a plurality of signals or data on a bus. The signals or data may include a command code or a program code. For example, when a command sequence is read, information such as read identification code or memory address is included.

In an exemplary embodiment, the memory control circuit unit 42 further includes an error detecting and correcting circuit 54, a buffer memory 55, and a power management circuit 56.

The error detecting and correcting circuit 54 is coupled to the memory management circuit 51 and configured to execute an error detecting and correcting operation to ensure the correctness of data. Specifically, when the memory management circuit 51 receives a write command from the host system 11, the error detecting and correcting circuit 54 generates a corresponding error correcting code (ECC) and/or an error detecting code (EDC) for data corresponding to the write command, and the memory management circuit 51 writes the data corresponding to the write command and the corresponding ECC and/or EDC into the rewritable non-volatile memory module 43. Next, when data is read from the rewritable non-volatile memory module 43, the memory management circuit 51 reads the ECC and/or the EDC corresponding to the data at the same time, and the error detecting and correcting circuit 54 executes an error detecting and correcting operation on the read data based on the ECC and/or the EDC.

The buffer memory 55 is coupled to the memory management circuit 51 and configured to temporarily store data. The power management circuit 56 is coupled to the memory management circuit 51 and configured to control the power of the memory storage device 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
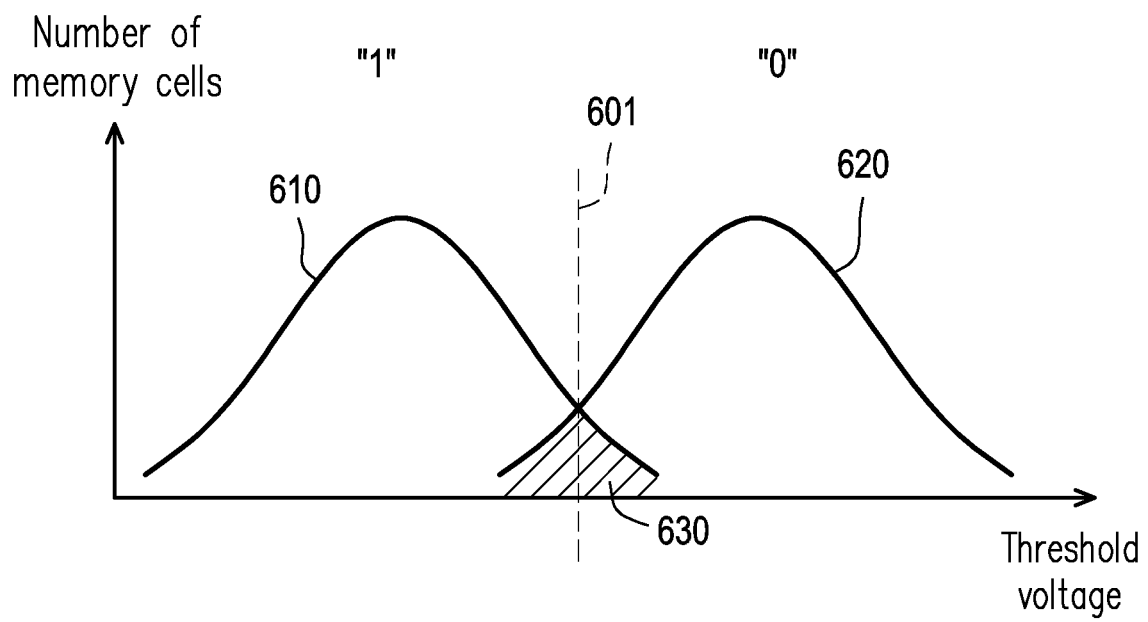
FIG. 6 is a schematic diagram of threshold voltage distribution of memory cells shown according to an exemplary embodiment of the invention.

FIG. 6 is a schematic diagram of threshold voltage distribution of memory cells shown according to an exemplary embodiment of the invention.

Please refer to FIG. 6, the horizontal axis represents the threshold voltage of the memory cells, and the vertical axis represents the number of memory cells. For example, FIG. 6 may represent the threshold voltage of each memory cell in one physical unit (also referred to as the first physical unit) in the rewritable non-volatile memory module 43. For example, the first physical unit may include one or a plurality of physical programming units.

It is assumed that state 610 corresponds to bit "1" and state 620 corresponds to bit "0". When the threshold voltage of a certain memory cell belongs to state 610, the memory cell stores bit "1". In contrast, if the threshold voltage of a certain memory cell belongs to state 620, the memory cell stores bit "0". It should be noted that in the present exemplary embodiment, one state in the threshold voltage distribution corresponds to one bit value, and the threshold voltage distribution of the memory cell has two possible states. However, in other exemplary embodiments, each state in the threshold voltage distribution may also correspond to a plurality of bit values and the distribution of the threshold voltage of the memory cell may also have four, eight, or any other states. In addition, the invention also does not limit the bits represented by each state. For example, in another exemplary embodiment of FIG. 6, state 610 may also correspond to bit "0", and state 620 corresponds to bit "1".

When data is to be read from the rewritable non-volatile memory module 43, the memory management circuit 51 may send a read command sequence to the rewritable non-volatile memory module 43. The read command sequence is configured to instruct the rewritable non-volatile memory module 43 to use at least one read voltage level to read the first physical unit to obtain the data stored in the first physical unit. For example, according to the read command sequence, the rewritable non-volatile memory module 43 may use a read voltage level 601 in FIG. 6 to read at least one memory cell in the first physical unit. If the threshold voltage in a certain memory cell is less than the read voltage level 601, the memory cell may be conducting, and the memory management circuit 51 may read bit "1". Or, if the threshold voltage of a certain memory cell is greater than the read voltage level 601, the memory cell may be not conducting, and the memory management circuit 51 may read bit "0".

Figure 7:
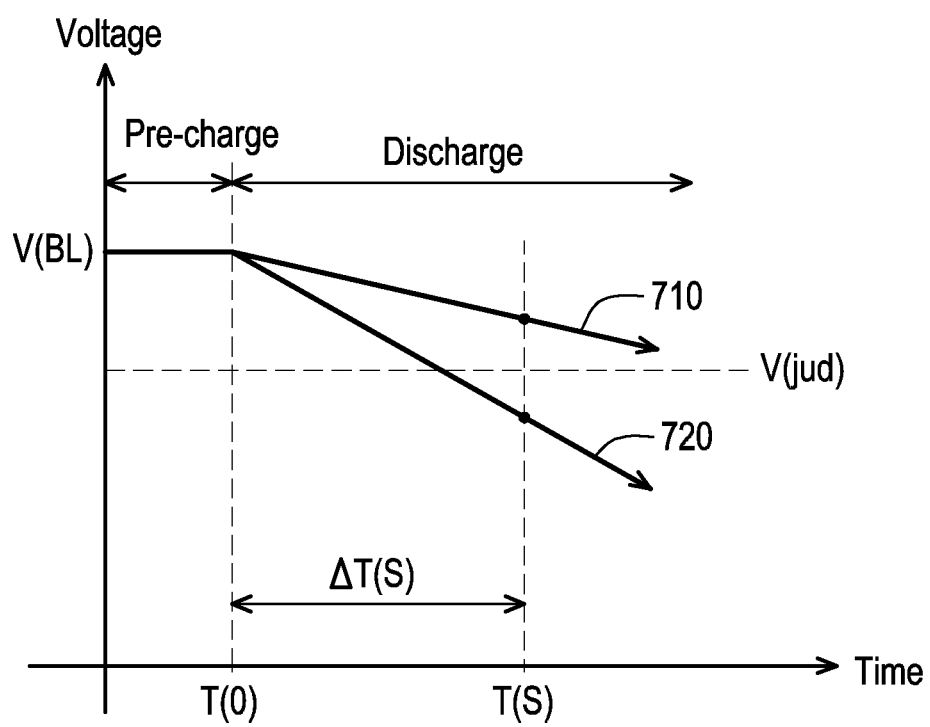
FIG. 7 is a schematic diagram of a voltage variation of a bit line where a target memory cell is located during a discharge process shown according to an exemplary embodiment of the invention.

FIG. 7 is a schematic diagram of a voltage variation of a bit line where a target memory cell is located during a discharge process shown according to an exemplary embodiment of the invention.

Please refer to FIG. 7, generally speaking, after the read command sequence is received, according to the read command sequence, the rewritable non-volatile memory module 43 may first perform pre-charge on a bit line (also called a target bit line) where a memory cell to be read (also called a target memory cell) is located, so as to charge the voltage (also referred to as the bit line voltage) of the bit line (i.e., the target bit line) where the memory cell to be read (i.e., the target memory cell) instructed by the read command sequence is located to a preset voltage value V(BL). After the pre-charge of the target bit line is completed, at time point T(0), the rewritable non-volatile memory module 43 may apply a read voltage (such as the read voltage level 601 of FIG. 6) to a word line (also referred to as a target word line) where the target memory cell is located. At the same time, the rewritable non-volatile memory module 43 may discharge the target bit line. During the discharge process, the voltage of the target bit line may be gradually decreased. Generally, if the applied read voltage is less than the threshold voltage of the target memory cell, the target memory cell is not conducting by the read voltage. In the case that the target memory cell is not conducting by the read voltage, the voltage of the target bit line may be dropped slowly due to the influence of the leakage current during the discharge process (as shown by curve 710 of FIG. 7). However, if the applied read voltage is not less than the threshold voltage of the target memory cell, the target memory cell may be conducting by the read voltage. When the target memory cell is conducting by the read voltage, the voltage of the target bit line may be dropped rapidly during the discharge process (as shown by curve 720 in FIG. 7). In an exemplary embodiment, time point T(0) is also referred to as a discharge start time point of the bit line.

After a period of discharge (such as $\Delta T(S)$), at time point T(S), the rewritable non-volatile memory module 43 may sense the voltage state of the target bit line and obtain the sensing result. In particular, the sensing result may reflect the voltage state of the target bit line after being discharged for a period of time (e.g., $\Delta T(S)$). For example, the sensing result may reflect whether the voltage of the target bit line is greater than a decision voltage (also referred to as a sensing voltage) V(jud) after a period of discharge (e.g., $\Delta T(S)$). Then, the rewritable non-volatile memory module 43 may return response data corresponding to the sensing result to the memory management circuit 51. According to the response data, the memory management circuit 51 may obtain the current data storage state of the target memory cell (for example, storage bit "0" or "1").

In an exemplary embodiment, it is assumed that the voltage variation of the target bit line during the discharge process is represented by curve 710. After the voltage state of the target bit line at time point T(S) is sensed, the obtained sensing result may reflect that the voltage of the target bit line at time point T(S) is greater than the decision voltage V(jud) (equivalent to the target memory cell is not conducting by the read voltage). According to the sensing result, the rewritable non-volatile memory module 43 may return the response data with bit "0" to the memory management circuit 51. According to the response data, the memory management circuit 51 may determine that the threshold voltage of the target memory cell belongs to state 620 of FIG. 6 and the target memory cell may store bit "0".

Or, in an exemplary embodiment, it is assumed that the voltage variation of the target bit line during the discharge process is represented by curve 720. After the voltage state of the target bit line at time point T(S) is sensed, the obtained sensing result may reflect that the voltage of the target bit line at time point T(S) is less than the decision voltage V(jud) (equivalent to the target memory cell may be conducting by the read voltage). According to the sensing result, the rewritable non-volatile memory module 43 may return response data with bit "1" to the memory management circuit 51. According to the response data, the memory management circuit 51 may determine that the threshold voltage of the target memory cell belongs to state 610 of FIG. 6 and the target memory cell may store bit "1".

Please return to FIG. 6, in an exemplary embodiment, one overlap region 630 (marked with oblique lines in FIG. 6) is included between state 610 and state 620. The overlap region 630 indicates that some memory cells in the first physical unit should store bit "1" (belonging to state 610), but the threshold voltage thereof is greater than the applied read voltage level 601; and, some memory cells in the first physical unit should store bit "0" (belonging to state 620), but the threshold voltage thereof is less than the applied read voltage level 601. In other words, in the data read by applying the read voltage level 601, some bits have errors.

In general, if the use time of most of the memory cells in the first physical unit is very short (e.g., the data is not stored for a long time in the first physical unit) and/or the use frequency of most of the memory cells in the first physical unit is very low (e.g., the read count, program count, and/or erase count of the memory cells are/is not high), the area of the overlap region 630 is usually very small, and there may even be no overlap region 630 (i.e., states 610 and 620 are not overlapped). Or, if the memory storage device 10 is just shipped from the factory, the overlap region 630 usually does not exist. If the area of the overlap region 630 is very small, the error bits in the data read from the first physical unit by applying the read voltage level 601 tend to be less.

However, as the use time and/or frequency of use of the rewritable non-volatile memory module 43 is increased, the area of the overlap region 630 may be gradually increased. For example, if the use time of the first physical unit is very long (for example, the data is stored in the first physical unit for a very long time) and/or the frequency of use of most memory cells in the first physical unit is very high (e.g., the read count, program count, and/or erase count of the memory cells are/is very high), the area of the overlap region 630 may become larger (e.g., states 610 and 620 become flatter and/or states 610 and 620 are closer to each other). If the area of the overlap region 630 is very large, the error bits in the data read from the first physical unit by applying the read voltage level 601 may be more.

In an exemplary embodiment, after the read data is received from the rewritable non-volatile memory module 43, the error detecting and correcting circuit 54 may decode the read data in an attempt to correct errors in the data. For example, the error detecting and correcting circuit 54 may support a low-density parity-check (LDPC) code. For example, the error detecting and correcting circuit 54 may utilize an LDPC code to encode and decode data. However, in another exemplary embodiment, the error detecting and correcting circuit 54 may also support BCH codes, convolutional codes, turbo codes, etc., and the invention is not limited thereto.

In an exemplary embodiment, the error detecting and correcting circuit 54 may use a specific decoding parameter to assist in decoding the data. Taking the LDPC code as an example, the decoding parameter may include a log likelihood ratio (LLR). For example, in a decoding operation, the error detecting and correcting circuit 54 may use an LLR to decode the read data. Alternatively, in another exemplary embodiment, the error detecting and correcting circuit 54 may also use other types of decoding parameters to decode the data, which is not limited by the invention.

In an exemplary embodiment, the decoding parameter may include reliability information. Taking the LLR as an example of reliability information, if the absolute value of the LLR (may be positive or negative) corresponding to a certain data bit is larger, the reliability of the data bit is higher, and the current bit value of the data bit has a higher probability to be regarded as correct. In contrast, if the absolute value of the LLR corresponding to a certain data bit is less, the reliability of this data bit is lower, and the higher the probability that the current bit value of the data bit is considered to be wrong. If a certain data bit is considered to be erroneous, the error detecting and correcting circuit 54 may correct the error during the current decoding operation, such as changing the bit value of the data bit. It should be noted that the decoding parameter may also include other types of reliability information, depending on the encoding/decoding algorithm adopted by the error detecting and correcting circuit 54.

It should be noted that, as the use time and frequency of use of the rewritable non-volatile memory module 43 are increased, and the overlap region 630 of FIG. 6 is changed or the ambient temperature is changed, continuously using the default decoding parameter to decode data results in a decrease in the decoding capability, error correction capability, and/or decoding efficiency of the error detecting and correcting circuit 54. Therefore, in the case that the internal and external environment may be changed, it is necessary to dynamically adjust the decoding parameter to improve the decoding capability, error correction capability, and/or decoding efficiency of the error detecting and correcting circuit 54.

In an exemplary embodiment, the memory management circuit 51 may send at least one read command sequence to the rewritable non-volatile memory module 43. The at least one read command sequence may instruct the rewritable non-volatile memory module 43 to read data from a specific physical unit (i.e., the first physical unit). After the at least one read command sequence is sent, the memory management circuit 51 may receive response data from the rewritable non-volatile memory module 43. The response data may include a plurality of identification bits. In particular, these identification bits may reflect the voltage variation of the bit line (also called the first bit line) where the specific memory cell (also called the first memory cell) in the first physical unit is located during the discharge process. Or, from another point of view, these identification bits may also reflect the reading results of the first memory cell at different times during the discharge process of the first bit line.

After the plurality of identification bits are obtained, the memory management circuit 51 may determine the decoding parameter corresponding to the first memory cell according to the plurality of identification bits. Then, the error detecting and correcting circuit 54 may decode the data read from the first memory cell according to the decoding parameter. In particular, by dynamically determining (e.g., updating or adjusting) the decoding parameter, the decoding capability, error correction capability, and/or decoding efficiency of the error detecting and correcting circuit 54 for the data read from the first memory cell may be effectively improved.

In an exemplary embodiment, the plurality of identification bits may reflect a plurality of sensing results of the voltage state of the first bit line at different time points during the discharge process of the first bit line. For example, the sensing results may be completely the same, partially the same, or completely different, depending on the current data storage state or programming state of the first memory cell.

In an exemplary embodiment, before the voltage state of the first bit line is sensed or the data storage state of the first memory cell is read, the rewritable non-volatile memory module 43 may pre-charge the first bit line. After the pre-charge of the first bit line is completed, the rewritable non-volatile memory module 43 may apply a read voltage (such as the read voltage level 601 of FIG. 6) to the word line where the first memory cell is located (also referred to as the first word line). At the same time, the rewritable non-volatile memory module 43 may discharge the first bit line. In other words, in an exemplary embodiment, the discharge process includes a discharge process of the first bit line after pre-charge. The implementation details of the pre-charge and discharge procedures are described in the exemplary embodiment of FIG. 7, and are not repeated herein.

In an exemplary embodiment, the at least one read command sequence has at least one time parameter. In particular, the at least one time parameter is configured to control a sensing time point of at least one of the plurality of identification bits. In an exemplary embodiment, the at least one time parameter being configured to control the sensing time point of at least one of the plurality of identification bits may also be regarded as the at least one time parameter may be configured to affect, determine, change, adjust, or update the sensing time point of at least one of the plurality of identification bits.

In an exemplary embodiment, assuming that one of the plurality of identification bits is called a first identification bit, and one of the at least one time parameter is called a first time parameter, the first time parameter may correspond to the time difference between the sensing time point of the first identification bit and the discharge start time point of the first bit line. For example, the first time parameter may be configured to control, affect, determine, change, adjust, or update the time difference between the sensing time point of the first identification bit and the discharge start time point of the first bit line.

In an exemplary embodiment, assuming that another of the plurality of identification bits is called a second identification bit, and another of the at least one time parameter is called a second time parameter, the second time parameter may correspond to the time difference between the sensing time point of the second identification bit and the discharge start time point of the first bit line. For example, the second time parameter may be configured to control, affect, determine, change, adjust, or update the time difference between the sensing time point of the second identification bit and the discharge start time point of the first bit line.

By analogy, according to the time parameter in the read command sequence, after the first bit line starts to discharge, the rewritable non-volatile memory module 43 may sense the voltage state of the first bit line at a specified time point and obtain a corresponding sensing result. Then, the rewritable non-volatile memory module 43 may return the sensing result in the form of a plurality of identification bits to the memory management circuit 51 via response data.

In an exemplary embodiment, the read command sequence having a time parameter may refer to one or a plurality of time parameters included in one read command sequence. In this way, after the read command sequence is received, the rewritable non-volatile memory module 43 may directly obtain the time parameter from the read command sequence.

In an exemplary embodiment, the read command sequence having time parameters may also mean that one or a plurality of time parameters are included in one set command sequence, and the set command sequence may be sent to the rewritable non-volatile memory module 43 together with the corresponding read command sequence. Accordingly, after the read command sequence and the corresponding set command are received, the rewritable non-volatile memory module 43 may obtain the time parameter corresponding to the read command sequence from the set command.

In an exemplary embodiment, the total number of time parameters in the read command sequence may be positively correlated with the total number of the plurality of identification bits. For example, assuming that the total number of time parameters in a certain read command sequence is three (that is, one read command sequence has three time parameters), after the first bit line starts to discharge, the rewritable non-volatile memory module 43 may respectively sense the voltage state of the first bit line at three designated time points according to the three time parameters and obtain corresponding sensing results. Then, the rewritable non-volatile memory module 43 may return the sensing result in the form of three identification bits to the memory management circuit 51 via response data. In particular, the three identification bits may respectively reflect the voltage states of the first bit line at the above three designated time points.

In an exemplary embodiment, the memory management circuit 51 may set the decoding parameter of the first memory cell according to whether the received plurality of identification bits meet certain conditions. For example, in response to the plurality of identification bits meeting a certain condition (also referred to as a first condition), the memory management circuit 51 may set the decoding parameter corresponding to the first memory cell to a certain value (also referred to as a first value). Or, in response to the plurality of identification bits meeting another condition (also referred to as a second condition), the memory management circuit 51 may set the decoding parameter corresponding to the first memory cell to another value (also referred to as a second value). The first condition is different from the second condition, and the first value is different from the second value. By analogy, according to the conditions met by the received plurality of identification bits, the decoding parameter of the first memory cell may be dynamically determined, updated, or adjusted.

Figure 8:
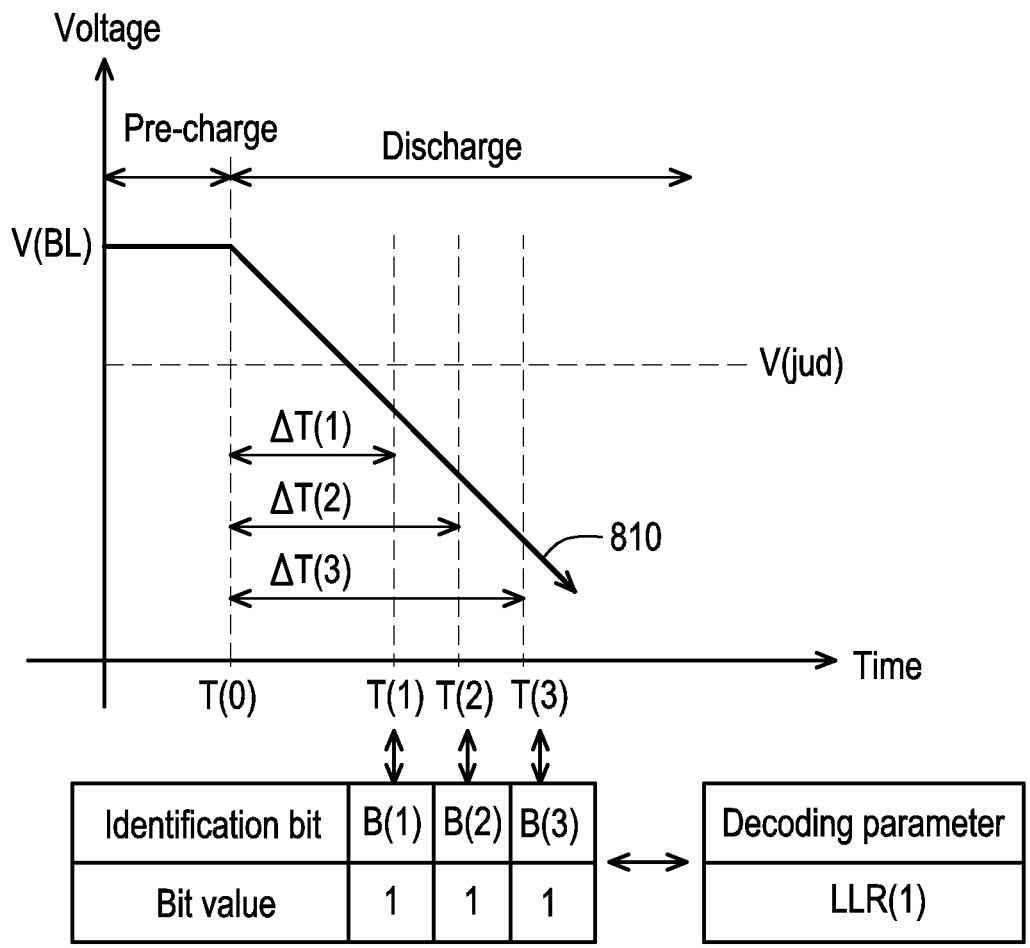
FIG. 8 is a schematic diagram of determining a decoding parameter corresponding to a first memory cell according to a plurality of identification bits shown according to an exemplary embodiment of the invention.

FIG. 8 is a schematic diagram of determining a decoding parameter corresponding to a first memory cell according to a plurality of identification bits shown according to an exemplary embodiment of the invention.

Referring to FIG. 8, it is assumed that one or a plurality of read command sequences may have three time parameters, and these three time parameters correspond to time differences $\Delta T(1)$, $\Delta T(2)$, and $\Delta T(3)$ respectively. In particular, the time difference $\Delta T(1)$ corresponds to the time difference between time point $T(1)$ (also referred to as the sensing time point of an identification bit $B(1)$) and time point T(0) (i.e., the discharge start time point of the first bit line), the time difference ΔT(2) corresponds to the time difference between time point T(2) (also referred to as the sensing time point of an identification bit B(2)) and time point T(0), and the time difference ΔT(3) corresponds to the time difference between time point T(3) (also referred to as the sensing time point of an identification bit B(3)) and time point T(0).

After the first bit line is pre-charged, the first bit line may start to be discharged at time T(0). According to the three time parameters, after the time differences ΔT(1), ΔT(2), and ΔT(3) are respectively passed, at time points T(1), T(2), and T(3), the rewritable non-volatile memory module 43 may sense the voltage state of the first bit line and generate the identification bits B(1), B(2), and B(3) according to the sensing results. In particular, an identification bit B(i) may reflect whether the voltage of the first bit line is greater than the decision voltage V(jud) at time point T(i).

It should be noted that in the exemplary embodiment of FIG. 8, curve 810 may represent the voltage variation of the first bit line during the discharge process. According to the relative relationship between curve 810 and the decision voltage V(jud), the sensing results for the first bit line at time points T(1), T(2), and T(3) all show that the voltage of the first bit line is less than the decision voltage V(jud). Therefore, the bit values of the identification bits B(1), B(2), and B(3) may all be determined as "1" to reflect the sensing results at time points T(1), T(2), and T(3).

After the response data from the rewritable non-volatile memory module 43 is received, according to the bit values of the identification bits B(1), B(2), and B(3), the memory management circuit 51 may determine the decoding parameter corresponding to the first memory cell as a parameter (also referred to as a first decoding parameter) LLR(1). The parameter LLR(1) includes a specific LLR. Then, the error detecting and correcting circuit 54 may use the parameter LLR(1) to decode the data read from the first memory cell.

Figure 9:
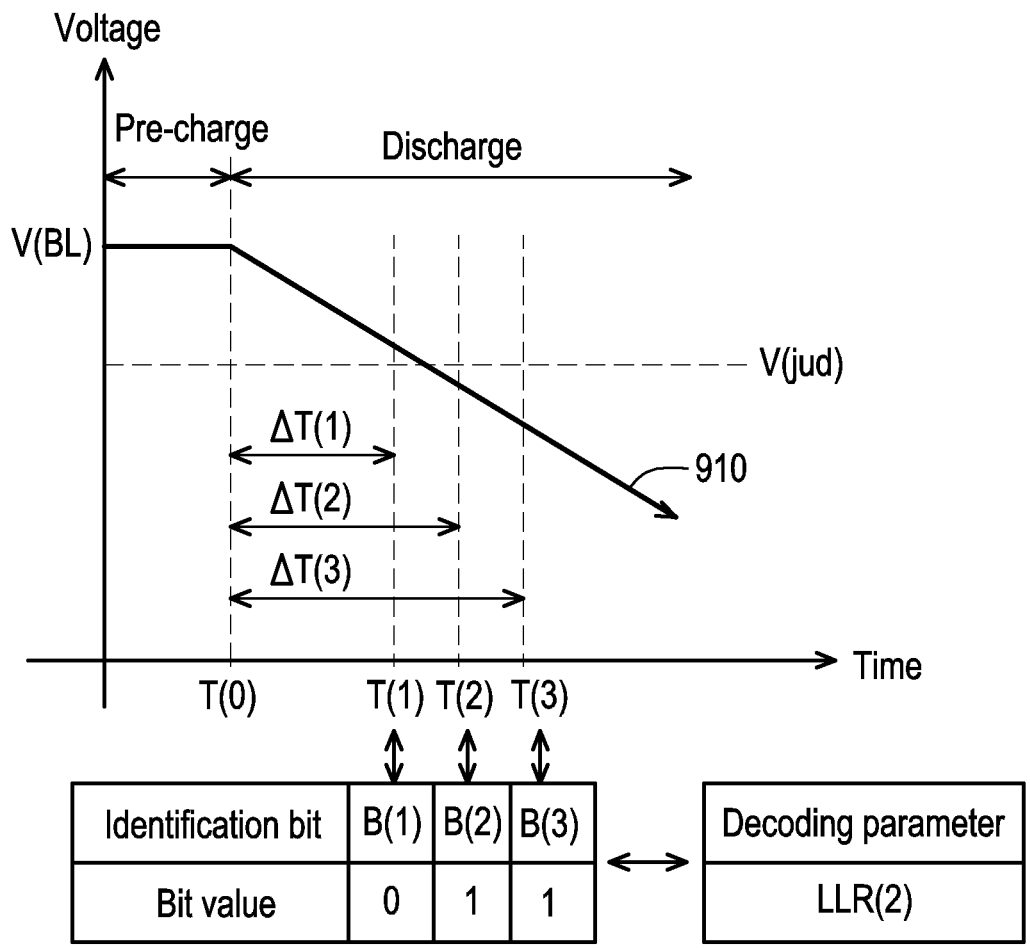
FIG. 9 is a schematic diagram of determining a decoding parameter corresponding to a first memory cell according to a plurality of identification bits shown according to an exemplary embodiment of the invention.

FIG. 9 is a schematic diagram of determining a decoding parameter corresponding to a first memory cell according to a plurality of identification bits shown according to an exemplary embodiment of the invention.

Referring to FIG. 9, it is assumed that one or a plurality of read command sequences also may have three time parameters, and these three time parameters correspond to the time differences ΔT(1), ΔT(2), and ΔT(3) respectively. After the first bit line is pre-charged, the first bit line may start to be discharged at time T(0). According to the three time parameters, after the time differences ΔT(1), ΔT(2), and ΔT(3) are respectively passed, at time points T(1), T(2), and T(3), the rewritable non-volatile memory module 43 may sense the voltage state of the first bit line and generate the identification bits B(1), B(2), and B(3) according to the sensing results.

It should be noted that in the exemplary embodiment of FIG. 9, curve 910 may represent the voltage variation of the first bit line during the discharge process. According to the relative relationship between curve 910 and the decision voltage V(jud), the sensing result for the first bit line at time point T(1) is that the voltage of the first bit line is greater than the decision voltage V(jud), and the sensing result for the first bit line at time points T(2) and T(3) is that the voltage of the first bit line is less than the decision voltage V(jud). Therefore, the bit values of the identification bits B(1), B(2), and B(3) may respectively be determined as "0", "1", and "1" to reflect the sensing results at time points T(1), T(2), and T(3). Next, according to the bit values of the identification bits B(1), B(2), and B(3), the memory management circuit 51 may determine the decoding parameter corresponding to the first memory cell as a parameter (also referred to as a second decoding parameter) LLR(2). For example, the parameter LLR(2) may include a specific LLR. Then, the error detecting and correcting circuit 54 may use the parameter LLR(2) to decode the data read from the first memory cell.

Figure 10:
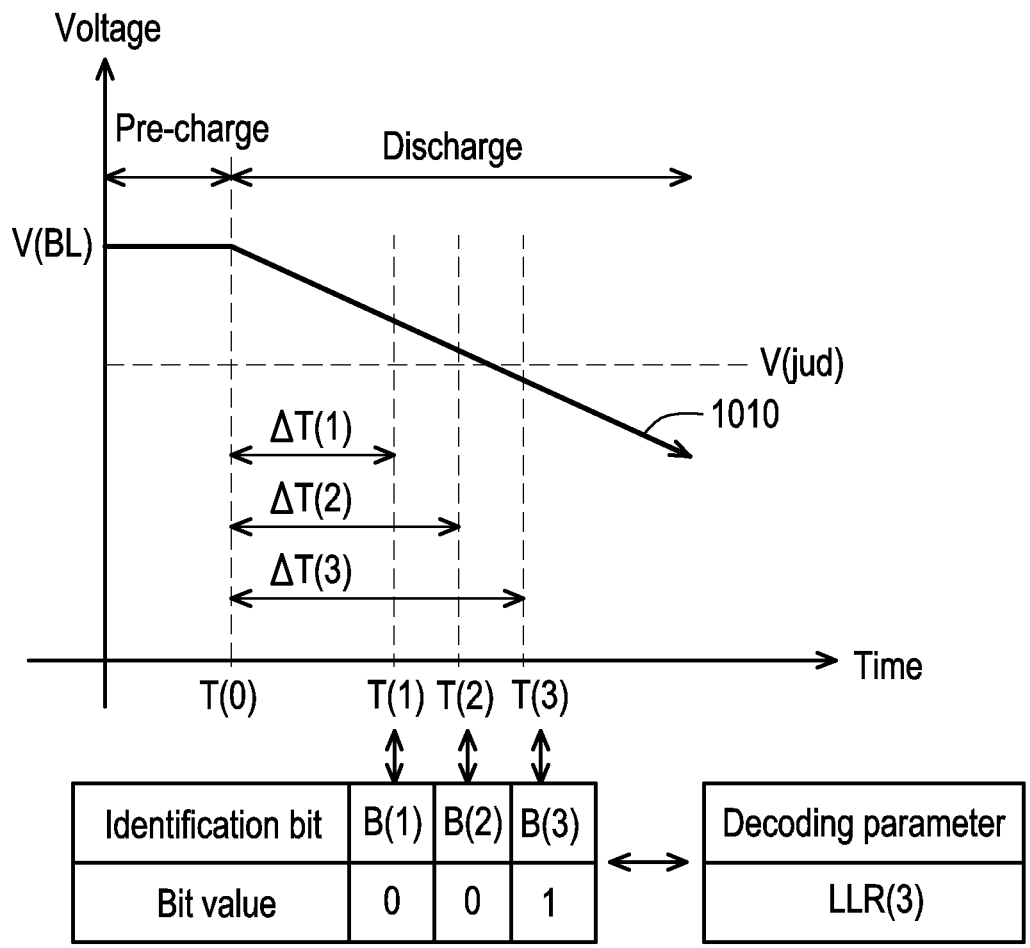
FIG. 10 is a schematic diagram of determining a decoding parameter corresponding to a first memory cell according to a plurality of identification bits shown according to an exemplary embodiment of the invention.

FIG. 10 is a schematic diagram of determining a decoding parameter corresponding to a first memory cell according to a plurality of identification bits shown according to an exemplary embodiment of the invention.

Referring to FIG. 10, it is assumed that one or a plurality of read command sequences also may have three time parameters, and these three time parameters correspond to the time differences ΔT(1), ΔT(2), and ΔT(3) respectively. After the first bit line is pre-charged, the first bit line may start to be discharged at time T(0). According to the three time parameters, after the time differences ΔT(1), ΔT(2), and ΔT(3) are respectively passed, at time points T(1), T(2), and T(3), the rewritable non-volatile memory module 43 may sense the voltage state of the first bit line and generate the identification bits B(1), B(2), and B(3) according to the sensing results.

It should be noted that in the exemplary embodiment of FIG. 10, curve 1010 may represent the voltage variation of the first bit line during the discharge process. According to the relative relationship between curve 1010 and the decision voltage V(jud), the sensing result for the first bit line at time points T(1) and T(2) is that the voltage of the first bit line is greater than the decision voltage V(jud), and the sensing result for the first bit line at time point T(3) is that the voltage of the first bit line is less than the decision voltage V(jud). Therefore, the bit values of the identification bits B(1), B(2), and B(3) may respectively be determined as "0", "0", and "1" to reflect the sensing results at time points T(1), T(2), and T(3). Next, according to the bit values of the identification bits B(1), B(2), and B(3), the memory management circuit 51 may determine the decoding parameter corresponding to the first memory cell as a parameter (also referred to as a third decoding parameter) LLR(3). For example, the parameter LLR(3) may include a specific LLR. Then, the error detecting and correcting circuit 54 may use the parameter LLR(3) to decode the data read from the first memory cell.

Figure 11:
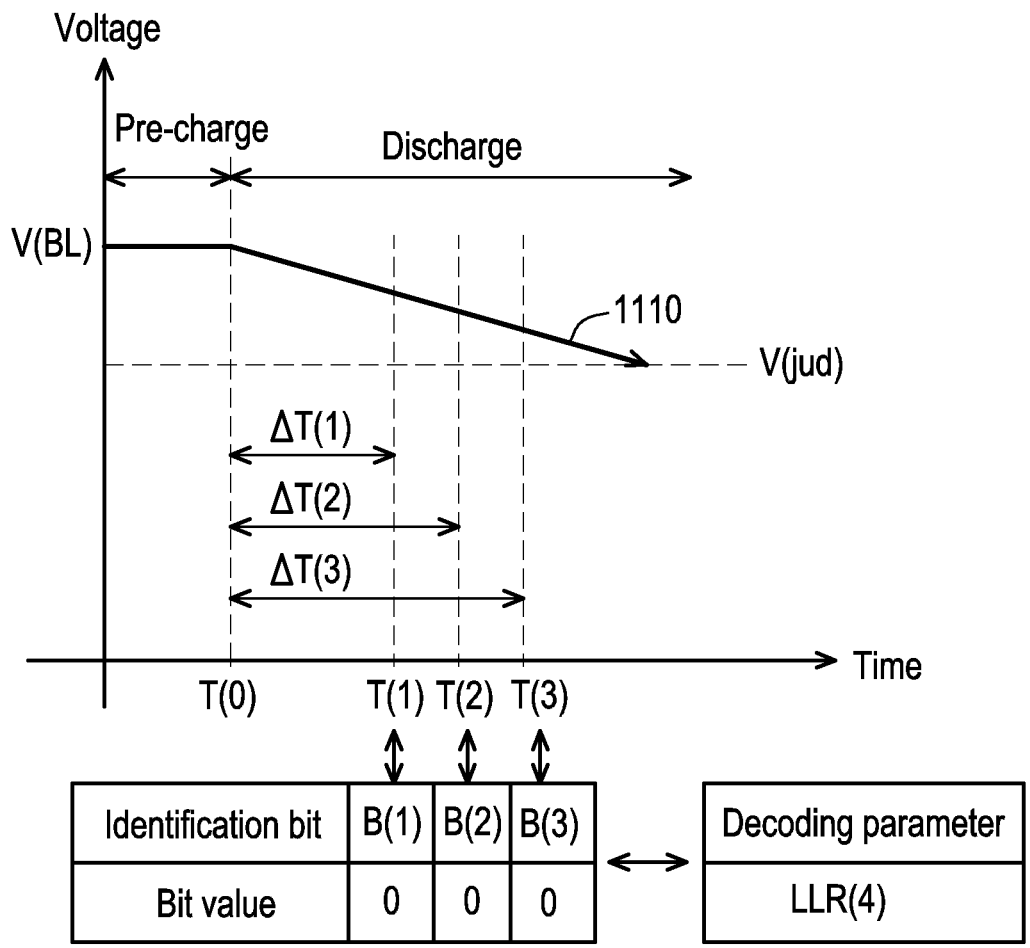
FIG. 11 is a schematic diagram of determining a decoding parameter corresponding to a first memory cell according to a plurality of identification bits shown according to an exemplary embodiment of the invention.

FIG. 11 is a schematic diagram of determining a decoding parameter corresponding to a first memory cell according to a plurality of identification bits shown according to an exemplary embodiment of the invention.

Referring to FIG. 11, it is assumed that one or a plurality of read command sequences also may have three time parameters, and these three time parameters correspond to the time differences ΔT(1), ΔT(2), and ΔT(3) respectively. After the first bit line is pre-charged, the first bit line may start to be discharged at time T(0). According to the three time parameters, after the time differences ΔT(1), ΔT(2), and ΔT(3) are respectively passed, at time points T(1), T(2), and T(3), the rewritable non-volatile memory module 43 may sense the voltage state of the first bit line and generate the identification bits B(1), B(2), and B(3) according to the sensing results.

It should be noted that in the exemplary embodiment of FIG. 11, curve 1110 may represent the voltage variation of the first bit line during the discharge process. According to the relative relationship between curve 1110 and the decision voltage V(jud), the sensing results for the first bit line at time points T(1), T(2), and T(3) all show that the voltage of the first bit line is greater than the decision voltage V(jud).

Therefore, the bit values of the identification bits B(1), B(2), and B(3) may all be determined as "0" to reflect the sensing results at time points T(1), T(2), and T(3). Next, according to the bit values of the identification bits B(1), B(2), and B(3), the memory management circuit 51 may determine the decoding parameter corresponding to the first memory cell as a parameter (also referred to as a fourth decoding parameter) LLR(4). For example, the parameter LLR(4) may include a specific LLR. Then, the error detecting and correcting circuit 54 may use the parameter LLR(4) to decode the data read from the first memory cell.

In an exemplary embodiment, the memory management circuit 51 may obtain the parameters LLR(1) to LLR(4) by looking up a table or using a specific algorithm. For example, the memory management circuit 51 may query one data table according to the bit values of the identification bits B(1), B(2), and B(3), so as to obtain the decoding parameters corresponding to the identification bits B(1), B(2), and B(3). Or, the memory management circuit 51 may input the bit values of the identification bits B(1), B(2), and B(3) into a specific algorithm, and obtain corresponding decoding parameters according to the output of the algorithm.

It should be noted that, in the exemplary embodiments of FIG. 8 to FIG. 11, the total number of time parameters in one read command sequence may be more (for example, five) or less (for example, two). According to the time parameters, more or less identification bits (for example, the identification bits B(1) to B(5)) may be obtained and configured to determine the decoding parameters corresponding to the first memory cell. The relevant operation details are all detailed above, and are not repeated herein.

In an exemplary embodiment, the first memory cell may be configured to represent any memory cell in the first physical unit. According to the above exemplary embodiments, the decoding parameters corresponding to at least some or all of the memory cells in the first physical unit may be determined and configured to decode data read from the first physical unit. Thereby, the decoding ability, error correction ability, and/or decoding efficiency of the data read from the first physical unit may be effectively improved.

In an exemplary embodiment, the time parameters are preset values. In an exemplary embodiment, the memory management circuit 51 may dynamically determine, adjust, or update the time parameters. For example, the memory management circuit 51 may determine, adjust, or update the time parameters according to the current risk state or health state of the rewritable non-volatile memory module 43 or the first physical unit. For example, the memory management circuit 51 may determine the risk state or health state of the rewritable non-volatile memory module 43 or the first physical unit according to the bit error rate, program count, erase count, read count, or temperature of the rewritable non-volatile memory module 43 or the first physical unit. The bit error rate may reflect the proportion of error bits in a piece of data. The program count, erase count, and read count may respectively reflect the number of times one physical management unit (e.g., one or a plurality of physical units) is programmed, erased, and read. Moreover, more parameters that may reflect the risk state or health state of the rewritable non-volatile memory module 43 or the first physical unit may also be configured to determine, adjust, or update the time parameters, and the invention is not limited thereto.

In an exemplary embodiment, in response to a certain time parameter being adjusted, the time difference (or sensing time point) corresponding to the time parameter may be changed correspondingly. Taking FIG. 8 as an example, in response to a certain time parameter being adjusted, one of the time differences ΔT(1), ΔT(2), and ΔT(3) may be correspondingly increased or decreased.

Figure 12:
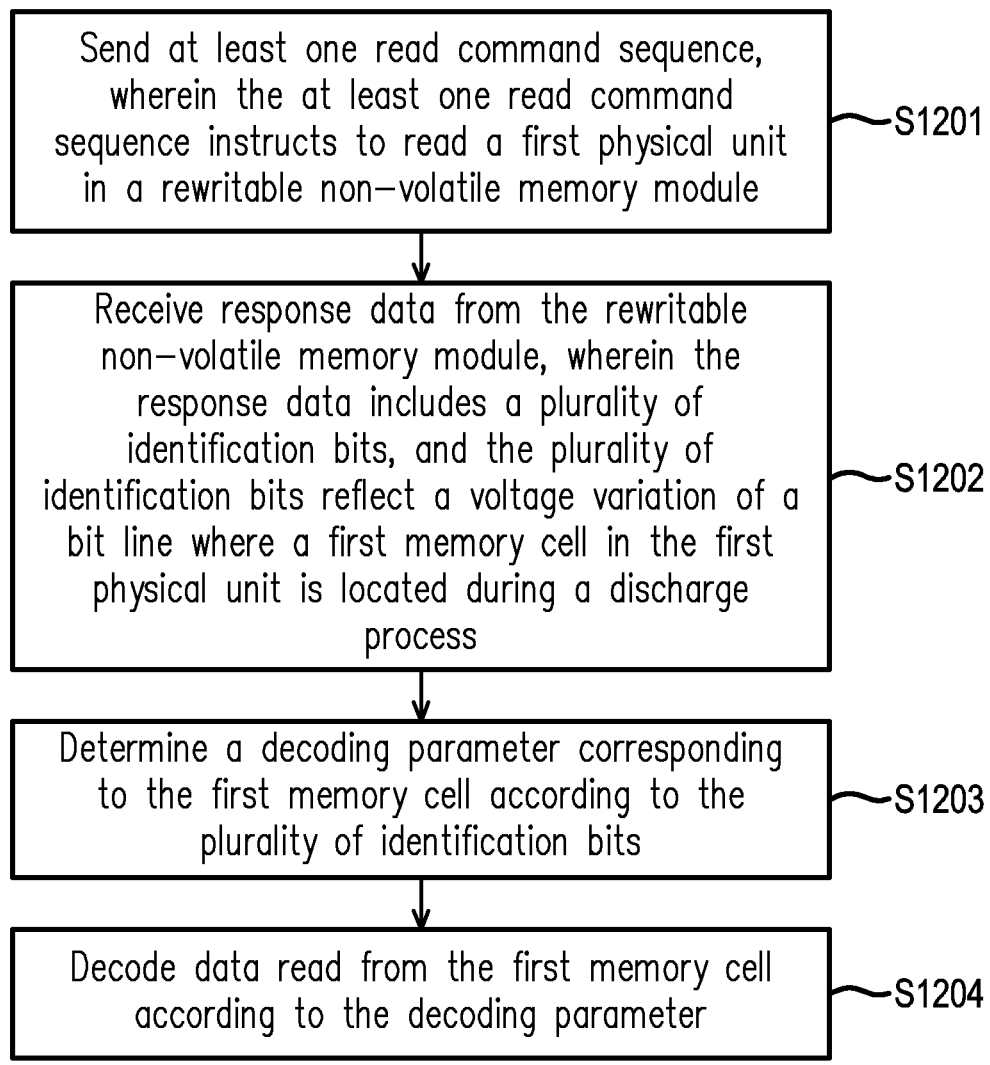
FIG. 12 is a flowchart of a decoding method shown according to an exemplary embodiment of the invention.

FIG. 12 is a flowchart of a decoding method shown according to an exemplary embodiment of the invention.

Referring to FIG. 12, in step S1201, at least one read command sequence is sent, wherein the at least one read command sequence instructs to read a first physical unit in a rewritable non-volatile memory module. In step S1202, response data from the rewritable non-volatile memory module is received, wherein the response data includes a plurality of identification bits, and the plurality of identification bits reflect a voltage variation of a bit line (i.e., a first bit line) where a first memory cell in the first physical unit is located during a discharge process. In step S1203, a decoding parameter corresponding to the first memory cell is determined according to the plurality of identification bits. In step S1204, data read from the first memory cell is decoded according to the decoding parameter.

However, each step in FIG. 12 is as described in detail above, and is not repeated herein. It should be mentioned that, each step in FIG. 12 may be implemented as a plurality of program codes or circuits, and the present application is not limited thereto. Moreover, the method of FIG. 12 may be used with the above exemplary embodiments, and may also be used alone, and the present application is not limited thereto.

Based on the above, the decoding method, the memory storage device, and the memory control circuit unit provided by the exemplary embodiments of the invention may dynamically determine the decoding parameter corresponding to the first memory cell according to the voltage state of the bit line where the first memory cell is located at different time points during the discharge process. By using a dynamically determined decoding parameter to decode the data read from the first memory cell, the decoding efficiency of the data may be effectively improved.

Although the disclosure has been disclosed by the above embodiments, they are not intended to limit the disclosure. It is apparent to one of ordinary skill in the art that modifications and variations to the disclosure may be made without departing from the spirit and scope of the disclosure. Accordingly, the protection scope of the disclosure will be defined by the appended claims.

What is claimed is:
1. A decoding method, configured for a rewritable non-volatile memory module, the decoding method comprising:
   sending at least one read command sequence, wherein the at least one read command sequence instructs to read a first physical unit in the rewritable non-volatile memory module;
   receiving response data from the rewritable non-volatile memory module, wherein the response data comprises a plurality of identification bits, and the plurality of identification bits reflect a voltage variation of a first bit line where a first memory cell in the first physical unit is located during a discharge process;
   determining a decoding parameter corresponding to the first memory cell according to the plurality of identification bits; and
   decoding data read from the first memory cell according to the decoding parameter.
2. The decoding method of claim 1, wherein the plurality of identification bits reflect a plurality of sensing results of a voltage state of the first bit line at different time points during the discharge process of the first bit line.

3. The decoding method of claim 1, wherein the discharge process comprises a discharge process of the first bit line after a pre-charge.

4. The decoding method of claim 1, wherein the at least one read command sequence has at least one time parameter, and the at least one time parameter is configured to control a sensing time point of at least one of the plurality of identification bits.

5. The decoding method of claim 4, wherein the plurality of identification bits comprise a first identification bit, the at least one time parameter comprises a first time parameter, and the first time parameter corresponds to a time difference between a sensing time point of the first identification bit and a discharge start time point of the first bit line.

6. The decoding method of claim 4, wherein a total number of the at least one time parameter is positively correlated with a total number of the plurality of identification bits.

7. The decoding method of claim 1, wherein the step of determining the decoding parameter corresponding to the first memory cell according to the plurality of identification bits comprises:
setting the decoding parameter corresponding to the first memory cell to a first value in response to the plurality of identification bits meeting a first condition; and
setting the decoding parameter corresponding to the first memory cell to a second value in response to the plurality of identification bits meeting a second condition, and the first value is different from the second value.

8. A memory storage device, comprising:
a connection interface unit configured to be coupled to a host system;
a rewritable non-volatile memory module; and
a memory control circuit unit coupled to the connection interface unit and the rewritable non-volatile memory module,
wherein the memory control circuit unit is configured to:
send at least one read command sequence, wherein the at least one read command sequence instructs to read a first physical unit in the rewritable non-volatile memory module;
receive response data from the rewritable non-volatile memory module, wherein the response data comprises a plurality of identification bits, and the plurality of identification bits reflect a voltage variation of a first bit line where a first memory cell in the first physical unit is located during a discharge process;
determine a decoding parameter corresponding to the first memory cell according to the plurality of identification bits; and
decode data read from the first memory cell according to the decoding parameter.

9. The memory storage device of claim 8, wherein the plurality of identification bits reflect a plurality of sensing results of a voltage state of the first bit line at different time points during the discharge process of the first bit line.

10. The memory storage device of claim 8, wherein the discharge process comprises a discharge process of the first bit line after a pre-charge.

11. The memory storage device of claim 8, wherein the at least one read command sequence has at least one time parameter, and the at least one time parameter is configured to control a sensing time point of at least one of the plurality of identification bits.

12. The memory storage device of claim 11, wherein the plurality of identification bits comprise a first identification bit, the at least one time parameter comprises a first time parameter, and the first time parameter corresponds to a time difference between a sensing time point of the first identification bit and a discharge start time point of the first bit line.

13. The memory storage device of claim 11, wherein a total number of the at least one time parameter is positively correlated with a total number of the plurality of identification bits.

14. The memory storage device of claim 8, wherein the operation of the memory control circuit unit determining the decoding parameter corresponding to the first memory cell according to the plurality of identification bits comprises:
setting the decoding parameter corresponding to the first memory cell to a first value in response to the plurality of identification bits meeting a first condition; and
setting the decoding parameter corresponding to the first memory cell to a second value in response to the plurality of identification bits meeting a second condition, and the first value is different from the second value.

15. A memory control circuit unit, configured to control a rewritable non-volatile memory module, the memory control circuit unit comprising:
a host interface configured to be coupled to a host system;
a memory interface configured to be coupled to the rewritable non-volatile memory module;
an error detecting and correcting circuit; and
a memory management circuit coupled to the host interface, the memory interface, and the error detecting and correcting circuit,
wherein the memory management circuit is configured to:
send at least one read command sequence, wherein the at least one read command sequence instructs to read a first physical unit in the rewritable non-volatile memory module;
receive response data from the rewritable non-volatile memory module, wherein the response data comprises a plurality of identification bits, and the plurality of identification bits reflect a voltage variation of a first bit line where a first memory cell in the first physical unit is located during a discharge process; and
determine a decoding parameter corresponding to the first memory cell according to the plurality of identification bits, and
the error detecting and correcting circuit is configured to decode data read from the first memory cell according to the decoding parameter.

16. The memory control circuit unit of claim 15, wherein the plurality of identification bits reflect a plurality of sensing results of a voltage state of the first bit line at different time points during the discharge process of the first bit line.

17. The memory control circuit unit of claim 15, wherein the discharge process comprises a discharge process of the first bit line after a pre-charge.

18. The memory control circuit unit of claim 15, wherein the at least one read command sequence has at least one time parameter, and the at least one time parameter is configured to control a sensing time point of at least one of the plurality of identification bits.

19. The memory control circuit unit of claim 18, wherein the plurality of identification bits comprise a first identification bit, the at least one time parameter comprises a first time parameter, and the first time parameter corresponds to a time difference between a sensing time point of the first identification bit and a discharge start time point of the first bit line.

20. The memory control circuit unit of claim 18, wherein a total number of the at least one time parameter is positively correlated with a total number of the plurality of identification bits.

21. The memory control circuit unit of claim 15, wherein the operation of the memory management circuit determining the decoding parameter corresponding to the first memory cell according to the plurality of identification bits comprises:

setting the decoding parameter corresponding to the first memory cell to a first value in response to the plurality of identification bits meeting a first condition; and setting the decoding parameter corresponding to the first memory cell to a second value in response to the plurality of identification bits meeting a second condition, and the first value is different from the second value.

* * * * *